US011914585B2

(12) United States Patent
Agrawal et al.

(10) Patent No.: US 11,914,585 B2
(45) Date of Patent: *Feb. 27, 2024

(54) SERVICING QUERIES OF A HYBRID EVENT INDEX

(71) Applicant: Dropbox, Inc., San Francisco, CA (US)

(72) Inventors: Abhishek Agrawal, San Francisco, CA (US); Samir Goel, San Francisco, CA (US); Franck Chastagnol, Woodside, CA (US); Adam Faulkner, San Francisco, CA (US); Jitendra Vaidya, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,854

(22) Filed: Jun. 28, 2022

(65) Prior Publication Data
US 2022/0327117 A1 Oct. 13, 2022

Related U.S. Application Data

(63) Continuation of application No. 15/171,983, filed on Jun. 2, 2016, now Pat. No. 11,468,053, which is a (Continued)

(51) Int. Cl.
*G06F 16/335* (2019.01)
*G06F 16/435* (2019.01)
(Continued)

(52) U.S. Cl.
CPC ............ *G06F 16/245* (2019.01); *G06F 16/22* (2019.01); *G06F 16/335* (2019.01);
(Continued)

(58) Field of Classification Search
CPC .... G06F 16/245; G06F 16/435; G06F 16/335; G06F 16/22; G06F 16/41; G06F 16/61; G06F 16/219; G06F 16/2455
(Continued)

(56) References Cited

U.S. PATENT DOCUMENTS 6,256,031 B1  7/2001 Meijer et al.
6,751,674 B1  6/2004 Satagopan et al.
(Continued)

OTHER PUBLICATIONS

Advisory Action from U.S. Appl. No. 14/983,775, dated May 16, 2022, 3 pages.
(Continued)

*Primary Examiner* — Shahid A Alam
(74) *Attorney, Agent, or Firm* — Polsinelli PC

(57) ABSTRACT

Disclosed are systems and methods of querying a hybrid event index of a user. The systems and methods can include receiving a search request pertaining to at least a first namespace of a plurality of namespaces and determining a first index server storing a first portion of the hybrid event index associated with the first namespace. The systems and methods can further include searching, the first portion of the hybrid event index stored at the first index server, determining one or more attributes from the search request, and determining a payload based on the search results of the first portion of the hybrid event index. Finally, the systems and methods can include applying one or more attributes to the payload and sending the filtered payload.

20 Claims, 7 Drawing Sheets

Related U.S. Application Data continuation-in-part of application No. 14/983,775, filed on Dec. 30, 2015, now abandoned.

(51) Int. Cl.
  *G06F 16/245* (2019.01)
  *G06F 16/22* (2019.01)
  *G06F 16/61* (2019.01)
  *G06F 16/41* (2019.01)

(52) U.S. Cl.
  CPC ............ *G06F 16/435* (2019.01); *G06F 16/41* (2019.01); *G06F 16/61* (2019.01)

(58) Field of Classification Search
  USPC ......................................................... 707/754
  See application file for complete search history.

(56) References Cited

U.S. PATENT DOCUMENTS

| | | | |
|---|---|---|---|
| 7,174,557 B2 | 2/2007 | Sanghvi et al. | |
| 7,587,517 B2 | 9/2009 | Huang et al. | |
| 8,108,483 B2 | 1/2012 | Aust et al. | |
| 8,386,509 B1* | 2/2013 | Scofield | G06F 16/9535 |
| | | | 707/706 |
| 8,458,467 B2 | 6/2013 | Dashora et al. | |
| 8,667,057 B1 | 3/2014 | Adya et al. | |
| 8,997,229 B1 | 3/2015 | Huang et al. | |
| 9,166,989 B2 | 10/2015 | Huang et al. | |
| 9,535,963 B1 | 1/2017 | Shankar et al. | |
| 10,754,837 B2* | 8/2020 | Mishra | G06F 16/219 |
| 11,048,766 B1 | 6/2021 | Chen et al. | |
| 11,194,775 B2* | 12/2021 | Mishra | G06F 16/2455 |
| 2002/0112008 A1 | 8/2002 | Christenson et al. | |
| 2003/0131020 A1 | 7/2003 | Karamanolis et al. | |
| 2004/0083305 A1 | 4/2004 | Wang et al. | |
| 2005/0120061 A1 | 6/2005 | Kraft | |
| 2006/0031572 A1 | 2/2006 | Feuerstein et al. | |
| 2006/0080120 A1 | 4/2006 | Tcherevik | |
| 2006/0179140 A1 | 8/2006 | John et al. | |
| 2006/0230026 A1 | 10/2006 | Pereira et al. | |
| 2007/0016575 A1 | 1/2007 | Hurst-Hiller et al. | |
| 2007/0038689 A1 | 2/2007 | Shinkai | |
| 2007/0110047 A1 | 5/2007 | Kim | |
| 2008/0114942 A1 | 5/2008 | Brown et al. | |
| 2009/0048994 A1 | 2/2009 | Applebaum et al. | |
| 2010/0169910 A1 | 7/2010 | Collins et al. | |
| 2012/0124029 A1 | 5/2012 | Kant | |
| 2012/0310960 A1 | 12/2012 | Watanabe et al. | |
| 2013/0311523 A1 | 11/2013 | Buban et al. | |
| 2014/0046909 A1 | 2/2014 | Patiejunas et al. | |
| 2014/0173052 A1 | 6/2014 | Newton et al. | |
| 2014/0279834 A1 | 9/2014 | Tsirogiannis et al. | |
| 2014/0279838 A1 | 9/2014 | Tsirogiannis et al. | |
| 2014/0279920 A1 | 9/2014 | Madhavarapu et al. | |
| 2015/0058320 A1 | 2/2015 | Zheng et al. | |
| 2015/0063567 A1 | 3/2015 | Robert et al. | |
| 2015/0154237 A1 | 6/2015 | Wable et al. | |
| 2015/0205674 A1 | 7/2015 | Schroth et al. | |
| 2015/0242413 A1 | 8/2015 | Goo et al. | |
| 2015/0347553 A1 | 12/2015 | Aizman et al. | |
| 2016/0080405 A1 | 3/2016 | Schler et al. | |
| 2016/0344834 A1 | 11/2016 | Das et al. | |
| 2017/0032468 A1 | 2/2017 | Wang et al. | |
| 2017/0180187 A1 | 6/2017 | Whitner et al. | |

OTHER PUBLICATIONS

Final Office Action from U.S. Appl. No. 14/983,775, dated Feb. 7, 2022, 22 pages.
Final Office Action from U.S. Appl. No. 14/983,775, dated Nov. 18, 2020, 19 pages.
Final Office Action from U.S. Appl. No. 15/171,983, dated Dec. 11, 2020, 42 pages.
Non-Final Office Action from U.S. Appl. No. 14/983.775, dated Apr. 20, 2020, 18 pages.
Non-Final Office Action from U.S. Appl. No. 14/983,775, dated Jun. 25, 2021, 21 pages.
Non-Final Office Action from U.S. Appl. No. 15/171,983, dated Jun. 2, 2020, 36 pages.
Non-Final Office Action from U.S. Appl. No. 15/171,983, dated Sep. 3, 2021, 52 pages.
Notice of Allowance from U.S. Appl. No. 15/171,983, dated Feb. 16, 2022, 10 pages.
Notice of Allowance from U.S. Appl. No. 15/171,983, dated Jun. 9, 2022, 17 pages.

\* cited by examiner

| Timestamp | Content ID | Namespace | Path | User ID | Event |
|---|---|---|---|---|---|
| t1 | 1 | A | /folder/filename1.doc | A1 | delete |
| t2 | 45 | CC | /folder/filename2.doc | B1 | add |
| t3 | 9 | G | /folder/filename3.doc | C1 | edit |
| t4 | 1,567 | I | /folder/filename4.doc | D1 | view |
| t5 | 487 | RR | /folder/filename5.doc | E1 | share |
| t6 | 46 | HR | /folder/filename6.doc | F1 | comment |
| t7 | 456 | B | /folder/filename7.doc | G1 | delete |
| t8 | 747 | ER | /folder/filename8.doc | H1 | delete |
| t8 | 747 | ER | /folder/filename8.doc | H1 | add |
| t9 | 456 | ER | /folder/filename9.doc | H1 | delete |
| t9 | 5 | ER | /folder/filename10.doc | H1 | delete |
| t9 | 56 | ER | /folder/filename11.doc | H1 | delete |

FIG. 4

SERVICING QUERIES OF A HYBRID EVENT INDEX

CROSS-REFERENCE TO RELATED APPLICATIONS

This application is a continuation and claims the benefit of U.S. application Ser. No. 15/171,983, filed on Jun. 2, 2016, entitled, SERVICING QUERIES OF A HYBRID EVENT INDEX, which is a continuation-in-part and claims the benefit of U.S. application Ser. No. 14/983,775, filed on Dec. 30, 2015, entitled, "SERVICING QUERIES OF AN EVENT LOG". All of which are expressly incorporated by reference herein in their entireties.

TECHNICAL FIELD

The present technology pertains to an event index of a content management system, and more specifically pertains to the creation and querying of the event index.

BACKGROUND

Recently, users have begun storing and managing all their personal digital information by using a content management system. Such services allow users to upload and store their personal digital information on server computers accessible on the Internet or other networks from various client devices. In some instances, the service may synchronize information between client devices and service server computers to facilitate user access to information locally at the client devices. One well-known content management system is the DROPBOX content management system provided by Dropbox, Inc. of San Francisco, California.

As user storage more information in the content management system, finding this information, can become a challenge. Fortunately computers are powerful tools for searching for relevant information among a vast amount of digital information.

Users of the content management system can modify their personal digital data in a number of ways. In some instances, users can edit, create, rename, or delete their personal digital data stored in the content management system. In other instances, users can comment, view, and share their personal digital data stored in the content management system. In still other instances, users can collaborate with other users using notes programs, such as the DROPBOX PAPER collaborative notes provided by Dropbox, Inc. These modifications are all time-related events (i.e., event streams) that take place on the content management system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer readable mediums of querying an event index of a user. The systems, methods, non-transitory computer readable mediums can include receiving a search request pertaining to at least a first namespace of a plurality of namespaces and determining a first index server storing a first portion of the event index associated with the first namespace, the first index server being one of a plurality of index servers, each of the plurality of index servers storing a portion of the event index pertaining to at least one namespace of the plurality of namespaces. The systems, method, non-transitory computer readable mediums can further include searching, the first portion of the event index stored at the first index server and determining a payload based on the search results of the first portion of the event indexes. Finally, the systems, methods, and non-transitory computer readable mediums can include applying one or more attribute filters to the payload and sending the filtered payload.

The systems, methods, and non-transitory computer readable mediums can also include that the search request includes a user identifier and a time period. 3. The systems, methods, and non-transitory computer readable mediums can also include the search request also pertaining to a shared namespace accessible by a user account.

The systems, methods, and non-transitory computer readable mediums can also include that the search server determines that the shared namespace is stored by a second index server of the plurality of index servers, the second index server storing a second portion of the event index associated with the shared namespace and searching the second portion of the event index stored at the second index server with the searching of the first portion of the event index at the first index server. In some examples, the searching of the second portion of the event index can be performed in parallel with the searching of the first portion of the event index.

The systems, methods, and non-transitory computer readable mediums can also include that the search server determines that the shared namespace is stored by the first index server, the first index server storing a second portion of the event index associated with the shared namespace and searching the second portion of the event index stored at the first index server in parallel with the searching of the first portion of the event index at the first index server.

The systems, methods, and non-transitory computer readable mediums can also include the event index includes a namespace index and a user identifier index, the searching of the namespace index and the user identifier index is performed in parallel, and intersecting the results of the namespace index and the user identifier index searches.

The systems, methods, and non-transitory computer readable mediums can also include determining that the payload is based on intersecting a main index with the search results from the portions of the event index of the plurality of index servers. The systems, methods, and non-transitory computer readable mediums can also include the attribute filters include at least one of an action type, path, event identifier.

The systems, methods, and non-transitory computer readable mediums can also include searching a dynamic index of events based on the search request, wherein the dynamic index of events store events that are more recent than the events stored in the plurality of the index servers, combining the search results from the dynamic index and the filtered payload, wherein the combining is based on chronological order, and sending the combined results.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 4 shows an example event index in accordance with some embodiments of the invention;

DETAILED DESCRIPTION

Figure 1:
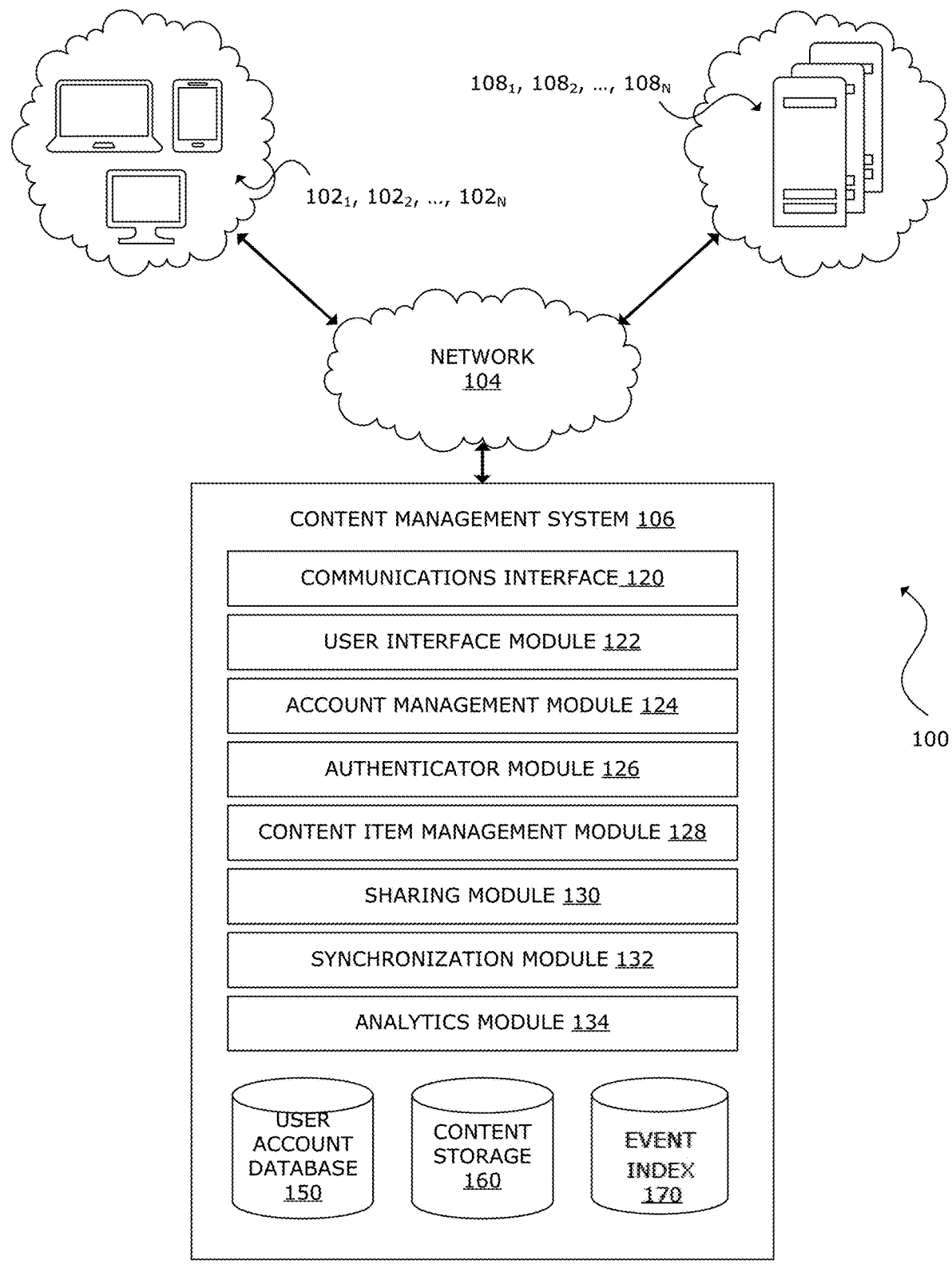
FIG. 1 shows an example configuration of devices and a network in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A "namespace" can be a set of symbols that are used to organize objects of various kinds, so that the objects can be referred to by name. For example, a computer file system. In some examples, a content management system can have a plurality of unique namespaces and each user of the content management system can have a unique namespace. Each namespace can consists of multiple content items (e.g., files and directories), along with a directory structure, and can be mounted at a certain directory path within the content management system. In some examples, a user's namespace can be mounted at "root" namespace (e.g., mounted at "/"). Namespaces enable easy support of shared content items between users. Each shared content item in the content management system can be represented by a separate namespace. The namespace can be mounted at a certain directory path within the "root" namespace for all users who have the shared permission.

The disclosed technology addresses the need in the art for querying an event index of content items stored at a content management system. A user can perform actions on accessible content items (e.g., in authorized namespaces) stored at the content management system. The actions can be stored in an event index of the content management system to create a history of user actions. The ability to query an event index enables a user access to historical details of actions performed over a period of time.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1, 102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device 102$_i$ or some other client device 102$_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc. Any user information or account information would be stored and used according to an industry accepted privacy policy.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102$_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 108₁, 108₂, ..., 108ₙ (collectively "108") via an Application Program Interface (API). Certain software applications can access content storage 160 via an API on behalf of a user. For example, a software package, such as an application running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing and sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

In some embodiments content management system 106 includes event index 170 that is configured to record events taking place with content items in content management system 106. A non-exclusive list of events can include add, delete, edit, view, share, comment, etc. Event index 170 can include data to identify when an event occurred, a content item identifier, a unique event identifier, event type, a user that performed the event, and the events, among other attributes. In some embodiments event index 170 can be queried by analytics module 134 to aggregate content item operations or user actions, to determine technology, usage, or business metrics, to aid search results when searching for a content item, and to identify potentially unintentional actions performed by user device 102ᵢ.

While content management system 106 is presented with specific components, it should be understood by one skilled in the art that the architectural configuration of system 106 is simply one possible configuration and that other configurations with more or fewer components are possible.

Figure 2:
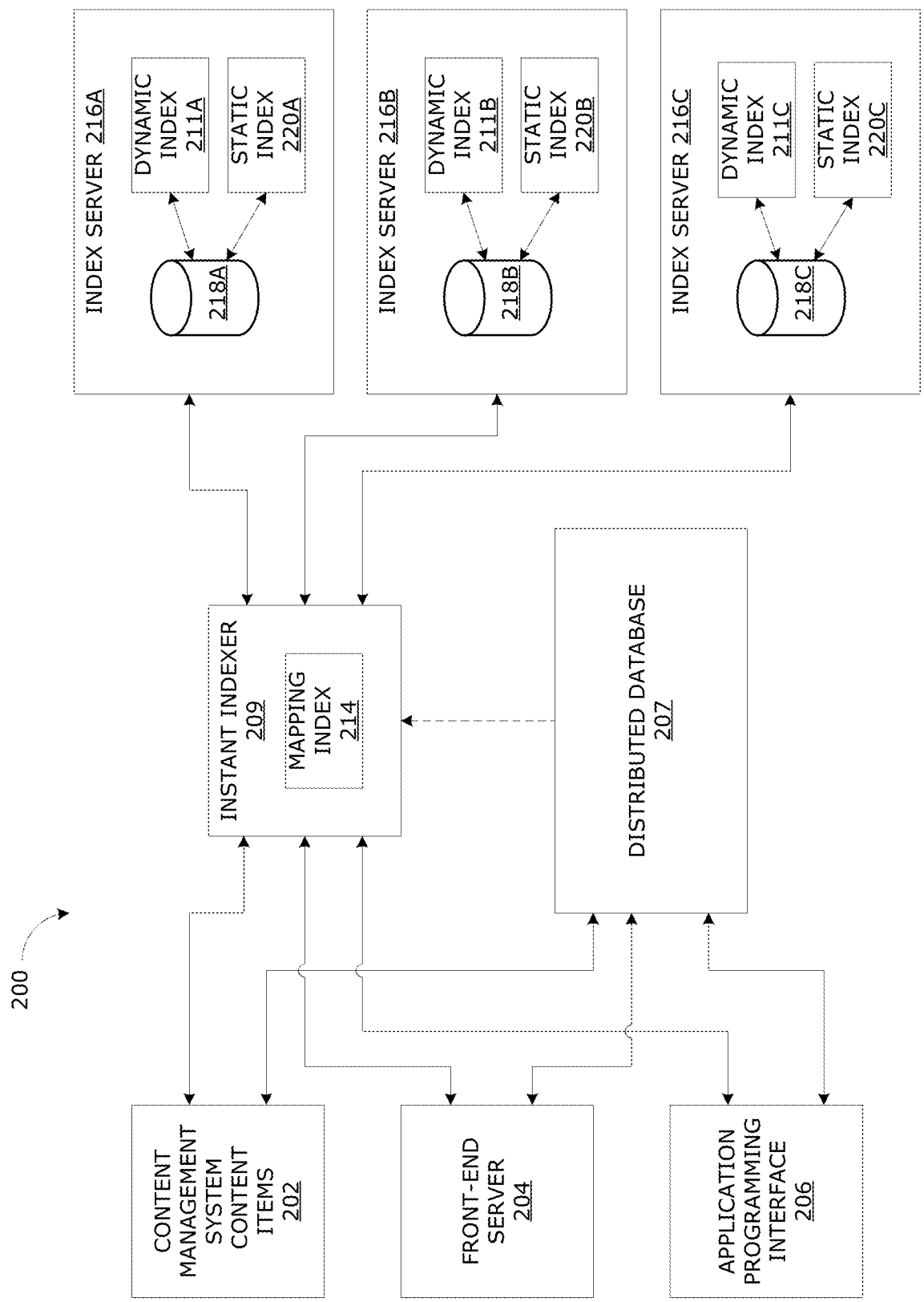
FIG. 2 is a block diagram of a basic computing device in accordance with some embodiments of the invention.

FIG. 2 illustrates a block diagram of an example event index creation system 200. Creation system 200 includes one or more event creation devices. For example, content management system content items 202 (e.g., stored in content storage 160), front-end server 204, and application programming interface 206. Creation system 200 also includes a distributed database, and one or more index servers 216 (e.g., 216A, 216B, 216C, etc.).

The event creation devices can create an event regarding an action on a content item by a user. For example, User A can add a new document to content management system content items 202. Thus, an event (i.e., add) was performed on a content item (i.e., document) by a user (i.e., User A). Content management system content items 202 can be stored at a service such as, DROPBOX content management system. In some embodiments, content management system content items 202 can be stored at any such service for storing cloud-based content items. Events are generated based on additions or modifications to content management system content items 202. For example, adding, creating editing, deleting, moving, renaming a content item. When a user modifies a content item (e.g., file, directory, etc.) an event identifier (e.g., unique identifier) and event type are created and associated with the user (e.g., user identifier and namespace identifier). After an event is created, the event identifier and all information associated with the event can be sent to distributed database 207.

Front-end server 204 can be an application server hosting content management system content items, such as DROPBOX content management service. In other embodiments, front-end server 204 can be any server configured for storing content items. The source data for creating events on an application server are tasks performed on content items stored at the application server. Thus, events are generated based on interactions with the content items. For example, viewing, sharing, or comments on content items stored at the application server. When a user interacts with a content item (e.g., file, directory, etc.) an event identifier and event type are created and associated with the user (e.g., user identifier and namespace identifier). After an event is created, the event identifier and all information associated with the event can be sent to distributed database 207.

Application program interface (API) 206 can be a set of routines, protocols and tools for interacting with content management system content items, such as DROPBOX PAPER collaborative notes. The source data for creating events through an API are interactions with a content management server by the API. Thus, events are generated based on the interactions with the content management service, through the API. For example, posting, sharing, commenting, editing with other users in a collaborative notes environment. When a user interacts in an API, an event identifier and event type are created and associated with the user (e.g., user identifier and namespace identifier). After an event is created, the event identifier and all information associated with the event can be sent to distributed database 207.

Distributed database 207 can be configured to receive event data from content management system content items 202, front-end server 204, and API 206. Upon receiving event data, the event data is written to distributed database 207. In some embodiments distributed database 207 can be a non-relational, distributed database. In some embodiments, distributed database 207 can be sparse, distributed multi-dimensional sorted mapping database.

Content management system content items 202, front-end server 204, and API 206 can also send the event identifier and all information associated with the event (i.e., after an event is created) to instant indexer 209. In other examples, the event identifier and all information associated with the event can be sent from distributed database 207 to instant index 209, as shown by the dashed line in FIG. 2. Instant indexer 209 can include a mapping index 214. Mapping index 214, given an identifier (e.g., user, namespace, event), can determine an index server (e.g., 216A, 216B, 216C, etc.) that stores sharded dynamic and static event indexes (e.g., 211A, 2111B, 211C, 220A, 220B, 220C, etc.) that indexes events in a given namespace. Accordingly, instant indexer 209 knows which index server 216 the event identifier and information associated with the event should be stored.

The new event identifier and information associated with the event can then be written to one or more dynamic indexes of a plurality of dynamic indexes (211A, 211B, 211C, etc.) stored at an index server (e.g., 216A, 216B, 216C, etc.). For example, each index server (e.g., 216A, 216B, 216C, etc.) can periodically (e.g., hourly, daily, etc.) request from instant indexer 209 events it is assigned to store. Since, instant indexer 209 is aware of which index server each event is to be store, instant indexer 209 can provide the appropriate event data (e.g., event identifier and information associated with the event) when requested by the index server. The appropriate event data can then be stored in the dynamic index of the requesting index server.

In some examples, the appropriate index server can be based on a namespace of the user. For example, a user can have access to two types of namespaces, a root namespace and a shared namespace. A root namespace, on a content management service, is assigned to the user on creation of an account with the content management server. The user has read/write access to the root namespace. A shared namespace, on a content management service, can be assigned (or accessed) to multiple users at various times throughout the life of the shared namespace. In some examples, the appropriate index server can be based on the namespace the event takes place. For example, when an event takes place on a content item stored in the root namespace (or shared namespace), the index server where the root namespace events have been stored previously and select that same index server for storage of the current event data.

In some embodiments of the invention, when an index server is determined, the resulting mapping of the index server and namespace identifier are stored in mapping index 214 for future requests. A deterministic mapping function can receive identifying information of the index server were the event data was stored (e.g., a hostname or a network address) and the namespace identifier. The deterministic mapping function can apply a hash function (e.g., one-way has function, a simple hash function, a consistent hash function, etc.) to the namespace identifier and store hashed value and the identifying information in mapping index 214. In other embodiments, deterministic mapping function 212 may include a hash mechanism and a modulo mechanism (shown in FIG. 3).

Index servers 216 can include a plurality of servers distributed in a horizontal fashion to provide load balancing, failover, or redundancy for event indexes (e.g., 211A, 2111B, 211C, 220A, 220B, 220C, etc.). In this case, each of the multiple index servers may store a replica or a copy of the dynamic and static event indexes. The static event indexes (e.g., 220A, 220B, 220C, etc.) can be stored on one or more partitions 218A, 218B, 218C of index servers 216. The dynamic indexes (e.g., 211A, 211B, 211C, etc.) can be stored on one or more partitions 218A, 218B, 218C of index servers 216. In some embodiments index servers 216 can include only one partition 218. The event indexes are described in detail in FIG. 6

Figure 3:
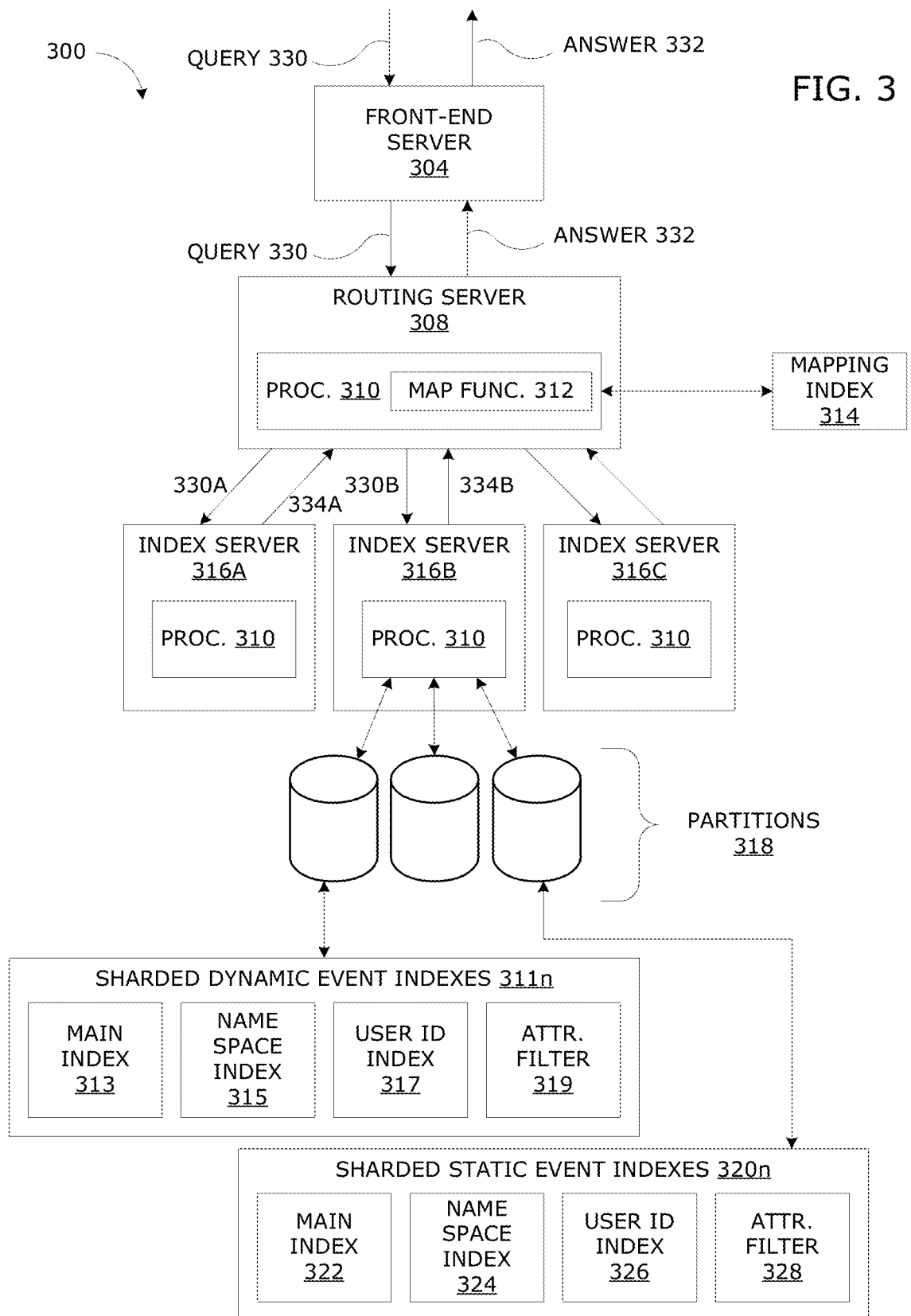
FIG. 3 is a block diagram of a serving system of a multi-user search system in accordance with some embodiments of the invention.

FIG. 3 illustrates a block diagram of an example serving system 300. Serving system 300 includes one or more servers 304 (collectively referred to herein as "front-end servers 304"), one or more servers 308 (collectively referred to herein as "routing server 308"), and processor 310.

Processor 310 is distributed over two-levels of servers: (1) one or more servers 316A, 316B, 316C (collectively referred to as "index servers 316") responsible for storing sharded dynamic event indexes $311_n$, sharded static event indexes $320_n$, and processing queries 330 against the event indexes $311_n$ and $320_n$ (e.g., main indexes 313, 322, namespace indexes 315, 324, user identifier indexes 317, 326, and attributes filter 319, 328) and (2) one or more servers 308 (collectively referred to as "routing servers 308") responsible for routing queries 330 from front-end servers 304 to the appropriate index servers 316 based on namespace identifiers associated with the queries 330 and combining answers 334 returned from index servers 316 into answers 332 that are then returned to the front-end servers 304 and ultimately to the client devices.

Dynamic index $311_n$ can include the most recent events (e.g., 24-hours, 48-hours, etc.) and can be mutable. In some instances, dynamic indexes $311_n$ can be queried instead of static indexes $320_n$ (e.g., when the query is time-limited to 24 hours, limited to a small number or recent events, etc.). In some instances, dynamic indexes $311_n$ can be queried in parallel to static indexes $320_n$ (e.g., when the query is time-limited for more than 24-hours, includes a large number of results, etc.). Static index $320_n$ can include historical events (e.g., older than 24-hours, etc.). The dynamic and static event indexes are explained in detail in FIG. 6. Each index (e.g., 313, 315, 317, 319, 322, 324, 326, and 328) of sharded event indexes $311_n$ and $320_n$ may be stored at a corresponding index server (e.g., 316A, 316B, 316C . . . 316N). Each index (e.g., 313, 315, 317, 319, 322, 324, 326, and 328) at an index server (e.g., 316B) may index events in one or more namespaces assigned to the index server (e.g., 316B).

In operation, front-end server 304 receives a search query 330 from a client device (e.g., $102_n$) and returns a personalized answer 332 thereto back to the client device. Answer 332 may be personalized in the sense that the events identified in answer 334 as relevant to query 330 may be restricted to only events that belong to a namespace that the user is authorized to access. As such, query 330 may be received at front-end search 304 in the context of an authenticated session established for an authenticated user (e.g., by username/password pair, FOB or mobile phone, biometric measurement, etc.). For example, the authenticated user may be a user of the client device that sent query 330 to front-end server 304.

Serving system 300 is capable of restricting answer 332 of query 330 to identifying only events indexed in event indexes $311_n$ and $320_n$ that satisfy query 330 and that belong to a namespace that the authenticated user is authorized to access (e.g., root namespace, shared namespace, etc.). Serving system 300 is able to perform this restricting even though event indexes $311_n$ and $320_n$ may index events that satisfy query 330 but that belong to a namespace that the authenticated user is not authorized to access.

The network request including query 330 from the user's client device may also specify identifier(s) of namespace(s) that the user wishes to search. In this case, an intersection of the set of identifier(s) of namespace(s) that the user wishes to search and the set of identifier(s) of authorized namespace(s) the user is permitted to access may be computed to determine identifier(s) of authorized namespace(s) to search. This intersection may be performed by front-end server 304.

If the network request including query 330 does not specific any requested namespaces to search, then a default set of identifier(s) of authorized namespace(s) to search may be selected. The default set can identify a) all namespaces the user is permitted to access (e.g., all namespaces associated with the authenticated user's account), or b) a subset thereof.

After the identifier(s) of authorized namespace(s) to search have been determined, a network request including query 330 and the identifier(s) of authorized namespace(s) to search may be sent from front-end server 304 to routing server 308 for further processing of query 330 by processor 310. In some embodiments, the network request (or query 330) can also include a user identifier (e.g., associated with the user's account), a type of event (e.g., add, edit, modify, delete, comment, view, share, etc.), a time range, one or more attributes (e.g., action type, path, document identifier, etc.), and/or a maximum number of results.

In response to receiving the network request from front-end server 304 including query 330 and the identifier(s) of the authorized namespace(s) to search, processor 310 at routing server 308 determines one or more index servers 316 to which to route query 330. This determination may be made based on results of routing server 308 applying deterministic mapping function 312 to each of the identifier(s) of the authorized namespace(s) to search. The deterministic mapping function 312 and mapping index 314, given an identifier of an namespace, may be used by routing server (e.g., 308) to determine an index server (e.g., 316B) that stores sharded dynamic and static event indexes (e.g., $311_n$ and $320_n$) that indexes events in the given namespace.

According to some embodiments of the invention, deterministic mapping function 312 applies a one-way hash function, a simple hash function, a consistent hash function, or the like to a namespace identifier to search in order to determine sharded dynamic and/or static event indexes (e.g., $311_n$ and $320_n$) to which the namespace is assigned. To make this determination, processor 310 at routing server 308 may have access to mapping index 314. Together, deterministic mapping function 312 and mapping index 314 provide a way for processor 310 at routing server 308 to determine a hostname or a network address of an index server (e.g., 316B) at which a sharded dynamic and/or static event indexes (e.g., $311_n$ and $320_n$) containing indexes for a given namespace is stored.

In some embodiments of the invention, deterministic mapping function 312 may include a hash mechanism and a modulo mechanism. Hash mechanism may accept a namespace identifier as input (e.g., character string data representing the namespace identifier) and may produce a hash value hv as output. For example, the hash mechanism may comprise the MD4, MD, SHA-1, or SHA2 message-digest algorithm which, when applied to a namespace identifier provided as input, produces a hash value (e.g., a 32-bit hash value) as output. The modulo mechanism may compute the remainder r of division of the hash value hv by a modulus k, thereby mapping the input namespace identifier to one of k values in the range of 0 to k−1. The value of the modulus k may be selected based on a variety of different factors including, for example, the number of actual, expected, or desired index servers 316, the number of actual, expected, or desired namespaces indexed by event indexes $311_n$ and $320_n$, and/or the number of actual, expected, or desired namespaces groups. In one exemplary embodiment, the value k is a power of 2 and equals at least 1024.

In some embodiments of the invention, mapping index 314 includes an entry for each index servers 316. Each such entry is keyed by one or more non-overlapping sub-ranges in the range 0 to k−1. For example, a first entry E1 in mapping index 314 may have a key including the values K1 and K2 defining a first range of consecutive values in the range 0 to k−1 and a second entry E2 in mapping 214 may have a key including the values K3 and K4 defining a second range of consecutive values in the range 0 to k−1 where the first range K1 to K2 does not overlap the second range K3 to K4.

When processor 310 at routing server 308 applies deterministic mapping function 312 to a given namespace identifier, a value r in the range 0 to k−1 may be produced. Processor 310 at routing server 308 may then consult mapping index 314 with the value r to identify the entry for which r is within the range of the entry key. A hostname or network address of this entry may identify an index server (e.g., 316) at which sharded dynamic and/or event indexes (e.g., $311_n$ and $320_n$) that indexes events belonging to the given namespace are stored.

In some embodiments of the invention, the namespaces assigned to a sharded dynamic and/or static event indexes (e.g., $311_n$ and $320_n$) are grouped into a fewer number of namespace groups of the sharded event indexes so as to reduce the number of index files stored at the index server (e.g., 316) at which the sharded event indexes are stored. In other words, within an index shard (e.g., $311_n$, $320_n$), the namespaces assigned to the sharded event indexes may be partitioned into namespace groups (e.g., partitions 318). Each such namespace group may comprise multiple namespaces.

Although, in FIG. 3, mapping index 314 is shown separately from deterministic mapping function 312 and processor 310 at routing server 308, mapping index 314 may be a component of deterministic mapping function 312 or a component of processor 310 at routing server 308. Further, each routing servers 308 may have access to mapping index 314. In this case, a copy of mapping index 314 may be stored (cached) at each routing servers 308 for efficient access. In addition or alternatively, mapping index 314 may be made available to routing servers 308 as a network service. Serving system 300 may comprise multiple routing servers 308 scaled in a horizontal fashion for load balancing, increased capacity, increased throughput, reduced latency, failover, and/or redundancy purposes.

In some instances, an index server (e.g., 316B) actually includes a plurality of servers distributed in a horizontal fashion to provide load balancing, failover, or redundancy for sharded event indexes $311_n$ and $320_n$. In this case, each of the multiple index servers may store a replica or a copy of sharded event indexes $311_n$ and $320_n$.

In some instances, index server 316 includes multiple servers in which each of the multiple servers stores a portion of sharded event indexes $311_n$ and $320_n$. In this case, there may be multiple levels of routing servers. A first routing level is exemplified by routing server 308 that routes query 330 received from front-end server 304 to one or more index servers 316. A second level of routing servers may exist to further route queries within index server 316 to one or more of the multiple servers of the index server. In this case, the second level routing servers may also have a deterministic mapping function and mapping like deterministic mapping function 312 and mapping index 314 for further routing the queries based on identifiers of namespaces.

In the example illustrated in of FIG. 3, query 330 is routed by routing server 308 according to deterministic mapping function 312 and mapping index 314 to index servers 316A and 316B. However, query 330 could just as easily have been routed to just a single index server or routed to more than two index servers, depending on the number of authorized namespaces to search with query 330. For example, if there is only one authorized namespace to search or if all of the authorized namespaces to search are assigned to the same sharded event indexes $311_n$ and $320_n$, then query 330 may have been routed by routing server 308 to just one index server 316B.

When routing query 330 to index server 316B, routing server 308 may send a network request to the index server including query 330. In addition, the network request may comprise identifier(s) of authorized namespace(s) to search assigned to sharded event indexes $311_n$ and $320_n$ stored at that index server. In addition, each such authorized namespace identifier may be associated in the network request with an identifier of the namespace group to which the namespace belongs.

In some embodiments, sharded event indexes $311_n$ and $320_n$ indexes events in four different indexes, main index 313, 322, namespace index 315, 324, user identifier index 317, 326, and attribute filter 319, 328. These indexes can be key/value pair indexes (e.g., LevelDB, etc.). The indexes can store events in reverse time order (i.e., newest events at top of index). Main index 313, 322 includes all events (and associated data of the events) of the namespaces for which index server 316B serves. Namespace index 315, 324 and user identifier index 317, 326 include subsets of events (and subset of associated data of the events) stored in the main index 313, 322 based on namespace identifiers and user identifiers, respectively. When routing server 308 determines (based on mapping function 312) that index server 316B includes events for a namespace of query 330, a partial query 330B is routed to index server 316B. When index server 316B receives partial query 330B, processor 310 can determine a partition 318 where events of the namespace to be queried are located. Namespace index 315, 324 and user identifier index 317, 326 can be traversed in parallel (i.e., keys of the indexes are traversed to determine matches with the namespace identifier or user identifier). Namespace index 315, 324 is traversed with a namespace identifier provided by query 330B and user identifier index 317, 326 is traversed with a user identifier provided by query 330B. In doing so, processor 310 at the index server 316B may restrict the events that can possibly be identified in answer 332B to only events that belong to an authorized namespace or user identifier to be searched. In some embodiments, the indexes are traversed for only a specific time period (e.g., last 24 hours, etc.). In some embodiments, only the dynamic event indexes $311_n$ is traversed. In other embodiments, both the dynamic and static event indexes $311_n$ and $320_n$ are traversed. The results from the query on namespace index 315, 324 can be intersected with the results from the query on user identifier index 317, 326 by event identifier (i.e., determine which events have the specified namespace identifier and user identifier). In other examples, more than two indexes can be intersected. For example, N indexes can be intersected.

The intersected results from the traversal of namespace indexes 315, 324 and user identifier indexes 317, 326 include all events that intersect with an authorized namespace (i.e., root namespace or shared namespace) and user identifier (i.e., associated with user account). However, the intersected results include only a subset of the associated data. In order to complete the query, the intersected results can be combined with main indexes 313, 322. Main indexes 313, 322, as previously described, include all events and all associated data (e.g., namespace identifier, user identifier, event type, time stamp, etc.). The combination of main indexes 313, 322 and the intersected results from the query of namespace index 315, 324 and user identifier 317, 326 creates a payload (i.e., a query of the events associated with the user identifier and namespace, along with all associated data).

In some instances, the payload can be filtered with attribute filter 319, 328. For example, when one or more attributes are included with query 330. The filtering can be performed before or after the payload is determined. In some embodiments, the attributes can be used to filter the payload. For example, an attribute of "path" can be provided with the query. In response to the attribute "path," the payload filters out all results where the "path" provided in the query does not equal the "path" in the payload.

In response to a completed query, index server 316B can send answer 334B to routing server 308 which may identify one or more events in one or more of the authorized namespaces that satisfy the query 330. In response to receiving answer 334B (and any other partial answers from other index serves 316) routing server 308 can send answer 332 to front end server 304 to return to the user.

As an example, assume the network request including query 330 sent from the front-end server 304 to the routing server 308 specifies that two authorized namespaces are to be searched with corresponding namespace identifiers "abcd" and "defg" and one user is to be searched with corresponding user identifier "User A". Further assume that according to deterministic mapping function 312 and mapping index 314, authorized namespace "abcd" belongs to namespace group "1234" and is assigned to sharded event indexes $311_n$ and $320_n$ of index server 316A and authorized namespace "defg" belongs to namespace group "5678" and is assigned to sharded event indexes $311_n$ and $320_n$ of index server 316B. In this case, the network request from routing server 308 to the index server 316A may specify that namespace "abcd" in namespace group "1234" is to be searched and the network request from routing server 308 to index server 316B may specify that namespace "defg" in namespace group "5678" is to be searched. Index server 316A may use the namespace group identifier "1234" in the network request sent to index server 316A to traverse namespace index 315, 324 and return results matching identifier "1234" along with associated event identifiers. Similarly, user identifier index 317, 326 can be traversed (in parallel) with user identifier "User A" to return results matching the user identifier and associated event identifiers. Similarly, the index server 316B may use the namespace group identifier "5678" and user identifier "User A" in the network request sent to index server 316B to search the corresponding indexes. The traversal results of namespace index 315, 324 and user identifier index 317, 326 can be intersected by the associated event identifiers (i.e., to determine which events have the specified namespace and user identifiers, remove duplicates, etc.). The intersected results can then be combined with main index 313, 322 to create a payload. The payload includes all data associated with the event (e.g., event type, time stamp, user identifier, namespace identifier, etc.).

FIG. 4 illustrates an example data stored in event index 400 (e.g., 170). As illustrated in FIG. 4, the data within the event index can be stored in a table, but persons ordinarily skilled in the art will appreciate many other data structures are possible. Further it will be appreciated that more or less information than timestamp (column 432), Content ID (column 434), Namespace (column 436), Path (column 438), User ID (column 440), and Event (column 442) can be captured in event index 400.

As illustrated in FIG. 4, event index 400 includes events (column 442) associated with a content item (e.g., file, directory, etc.). Each event corresponding to a content item can be recorded in event index 400. A non-exhaustive list of events can include add, delete, edit, view, share, comment, etc. In the first row of the table illustrated in FIG. 4 corresponding to timestamp 't1,' the event (column 442) is a delete event.

A content ID in column 434 can identify each content item in the table. For example, the delete event in the first row (timestamp 't1') is associated with a content item given content Identifier "1" in column 434. Content Identifiers (column 434) can be any assigned value or a hash of the content item name or portion of the content item contents. In some embodiments the content item can be identified by the content item name in the path stored in column 438, and an explicit content identifier such as illustrated in column 434 may not be needed.

An event, such as the delete event in the first row of the table is also associated with a timestamp (column 432). In some embodiments, the timestamp can be the time that the event was committed to content management system 106. In some embodiments the timestamp can be a time that the event actually occurred (events can occur on client device 102 and synced and committed to content management system 106 using synchronization module 132 at a later time).

An event, such as the delete event in the first row of the table is also associated with a Namespace (column 436). A namespace can be considered to be analogous to a root level of a file system directory, except that content management system 106 manages many namespaces. As such, each namespace is an abstraction for the root directory of a more traditional file system directory tree. Each user has private access to a root namespace. In addition, every shared collection is a namespace that can be mounted within one or many root namespaces. With this abstraction, every content item on content management system 106 can be uniquely identified by two values: a namespace (column 436) and a relative path (column 438). The namespaces shown in column 436 can be root namespaces or shared collection namespaces. The paths shown in column 438 reflect a path under either a root namespace or shared collection namespace. The path can identify subdirectories and end in a file name.

The table illustrated in FIG. 4 also includes User IDs shown in column 440. Each user ID has access to a root namespace, and any shared namespace (shared collection) made available to the user through a root namespace. The User ID shown in column 440 can reflect the user that caused the event. For content items in a root namespace, this is the user that owns the private root namespace. However, for content items in a shared namespace, many users have access to the same content item, and thus the user that is responsible for the event is recorded in event index 400.

Figure 5:
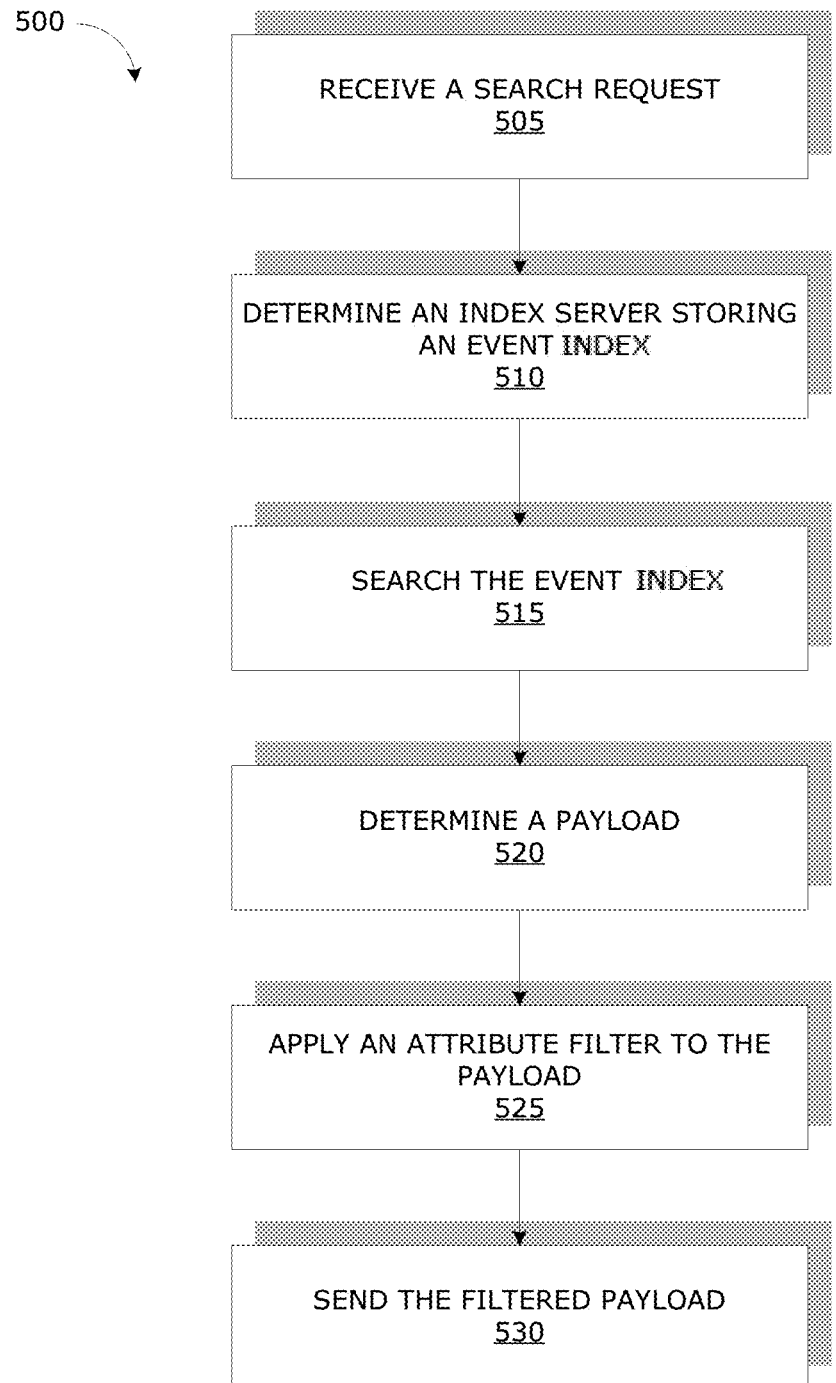
FIG. 5 is a flow diagram of an example method of querying a serving system in accordance with some embodiments of the invention.

The method shown in FIG. 5 is provided by way of example, as there are a variety of ways to carry out the method. Additionally, while the example method is illustrated with a particular order of sequences, those of ordinary skill in the art will appreciate that FIG. 5 and the sequences shown therein can be executed in any order that accomplishes the technical advantages of the present disclosure and can include fewer or more sequences than illustrated.

Each sequence shown in FIG. 5 represents one or more processes, methods or subroutines, carried out in the example method. The sequences shown in FIG. 5 can be implemented in a system such as system 300 shown in FIG. 3. The flow chart illustrated in FIG. 5 will be described in relation to and make reference to at least the elements of serving system 300 shown in FIG. 3.

FIG. 5 shows an example flow diagram 500 for serving a query of an event stream on a cloud based content management service. Flow diagram 500 can begin at sequence 505, at which point a server (e.g., front-end server 304 and/or routing server 308) can receive a search request (e.g., query 330). In some examples, the search request can pertain to at least one namespace identifier (e.g., the root namespace of a user) of a plurality of namespaces. In other examples, the namespace can be a shared namespace between one or more users. The search request can also include a user identifier and/or a time period. In other examples, the search request can include an event type and/or a maximum number or results.

In the example, when the search request is received at front-end server 304, the search request can be sent to one of a plurality of routing servers 308. In other examples, the front-end server 304 and routing servers 308 are the same. When the search request is received, method 500 can proceed to sequence 510.

At sequence 510, one or more index servers storing event indexes can be determined. In some examples, processor 310 can invoke mapping function 312 to search mapping index 314 for matches with the namespace identifiers (e.g., identified in sequence 505) as illustrated in FIG. 3. Processor 310 can receive from mapping index 314, one or more index servers of a plurality of index servers storing event indexes pertaining to the namespace identifiers of sequence 505. The one or more index servers identified can be searched in parallel. When one or more index servers have been determined, method 500 can proceed to sequence 515.

At sequence 515, a request (e.g., query 330) can be sent to the identified index servers to scan event indexes (e.g., sharded event indexes 311$_n$ and 320$_n$) stored at the identified index servers. The event indexes can include main index 313, 322, namespace index 315, 324, user identifier index 317, 326, and attribute filter 319, 328. In some examples, only sharded dynamic event index 311$_n$ can be scanned (e.g., when the query is time limited to 24-hours, limited to a small number or recent events, etc.) In some examples, sharded dynamic event indexes 311$_n$ and sharded static event indexes 320$_n$ can be queried (e.g., when the query is time-limited for more than 24-hours, includes a large number of results, etc.). As illustrated in FIG. 3, scanning an event index can include traversing, in parallel, namespace index 313, 322 (by a namespace identifier from query 330) and user identifier index 315, 324 (by a user identifier from query 330). The results from traversing the indexes can be combined, by event identifiers, to determine which events have the specified namespace and user identifiers and/or remove any duplicate entries. When the event index has been scanned, method 500 can proceed to sequence 520.

At sequence 520, a payload can be determined from the results of the event index scanned. In some instances, a payload can be determined by intersecting the scan results of the event index with main index 313, 322. For example, the event identifiers from the scan results of the event index can be used to locate the corresponding event identifiers in main index 313, 322. As previously discussed, main index 313, 322 includes event identifiers and all corresponding data (e.g., event type, namespace, user identifier, timestamp, attributes, etc.). When a payload has been determined, method 500 can proceed to sequence 525.

At sequence 525, one or more attribute filters can be applied to the payload. In some examples, one or more attributes can be included in the scan request (e.g., query 330). The one or more attributes can be used to filter out non-matches with the payload. For example, if an attribute filter of "path" is applied to the payload, the payload will only include event identifiers (and the associated data) that match the "path" attribute (i.e., removing all other event identifiers from the payload). In other examples, one or more event identifiers can be determined from traversing attribute filter 319, 328. The results from the traversal can then be intersected with the payload (or the results from sequence 415). When the payload has been filtered, method 500 can proceed to sequence 530.

At sequence 530, the filtered payload can be sent from index servers 316 to routing servers 308. Routing servers 308 can in-turn send the filtered payload to front-end sever 304, which can provide the filtered payload to the user. When the filtered payload has been sent, method 500 can end.

Figure 6:
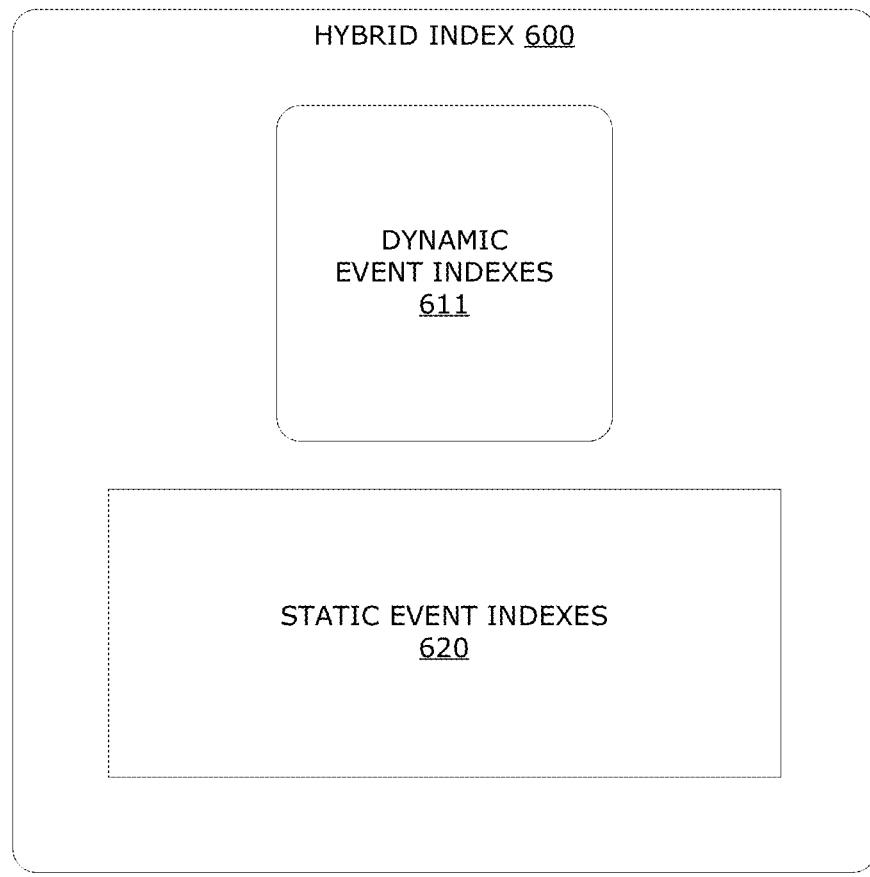
FIG. 6 is a block diagram of a dual level sharded event index in accordance with some embodiments of the invention.

FIG. 6 illustrates dual level sharded event index 600. Dual layer sharded event index 600 can include dynamic event index 611 and static event index 620. Both of these indexes can be sharded and can be a key/value pair index (as described in FIG. 2 and FIG. 3). Dynamic event index 611 can be mutable and updated when new event data is received at the index server as shown in FIG. 2 (e.g., from an offline indexing pipeline utilizing an instant indexer including all events from content management system 106, from event index 170, etc.). The new event data can be stored in reverse time order (i.e., newest events at top of index). Static event index 620 can be an immutable index (i.e., the data cannot be altered). In some examples, static event index 620 can include merged event data from dynamic event index 611. For example, after a predetermined period (e.g., 24 hours, 48 hours, etc.) data from dynamic event index 611 can be merged (e.g., added, intersected, compressed, etc.) and stored in static event index 620. After every predetermined period, static event index 620 can be regenerated with the older data (e.g., data stored longer than the predetermined period) from dynamic event index 611. In some examples, dynamic event index 611 can have a data retention period of 24 hours and static event index 620 can have a data retention period of 45 days. Accordingly, when data in dynamic event index 611 is older than 24 hours, the data is removed from dynamic even index 611 and merged with the data in static event index 620, and when the data in static event index 620 is older than 45 days, the data is deleted from static event index 620.

During event queries, as shown in FIG. 3, static event index 620 can also be scanned. For example, when a time period is specified with the query, and the time period extends beyond events stored in dynamic event index 611, processor 310 can scan static event index 620. In other examples, when a maximum results is specified with the query, and the maximum results extends beyond events stored in dynamic event index 611, processor 310 can scan static event index 620. In some examples, static event index 620 can be used to regenerate dynamic event index 611 (e.g., during a disk or system failure, disaster event, etc.).

Figure 7A:
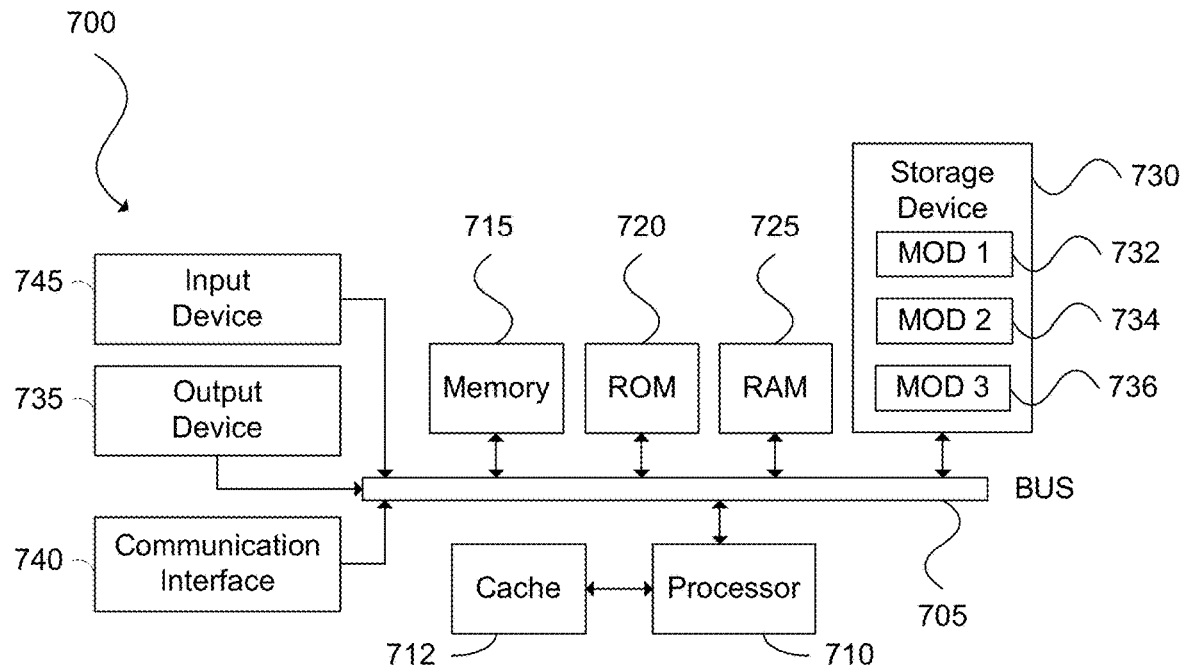
FIG. 7A shows an exemplary possible system embodiment for implementing various embodiments of the present technology.
Figure 7B:
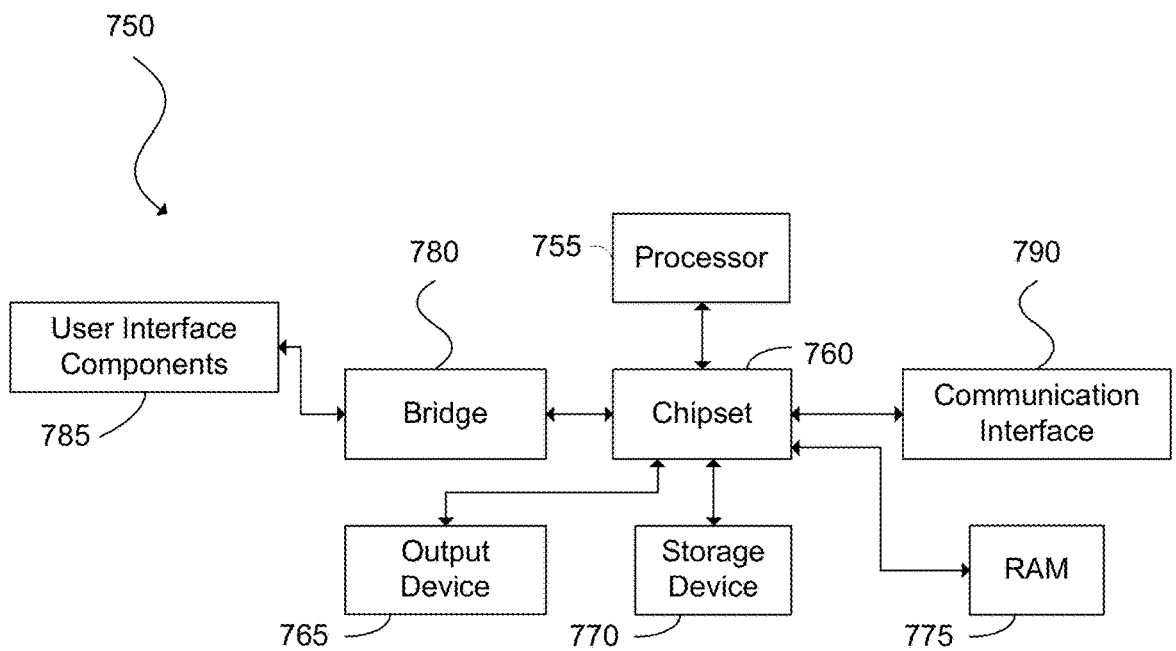
FIG. 7B shows an exemplary possible system embodiment for implementing various embodiments of the present technology.

FIG. 7A and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 70. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of querying a service, the method comprising:
   receiving a query for an event associated with a user account of the service;
   determining an index server from a plurality of index servers that store events associated with the service, wherein the index server comprises a plurality of indexes that index event identifiers based on different properties of an event;
   searching a first index of the plurality of indexes based on a first property associated with events stored in the index server;
   searching a second index of the plurality of indexes based on a second property associated with events stored in the index server;
   determining a payload based on search results identified from searching the first index and the second index;
   filtering the payload based on parameters identified in the query; and
   sending the filtered payload to a device associated with the user account, wherein the filtered payload is configured to allow the user account to receive the events that the user account is authorized to access and are identified in the query.

2. The method of claim 1, wherein the query identifies at least one namespace accessible by the user account.

3. The method of claim 1, wherein events are stored in the first index and the second index in reverse time order.

4. The method of claim 1, wherein the searching of the first index or the second index is completed based on a timestamp associated with an event.

5. The method of claim 1, wherein the first index comprises a namespace index that relates an event identifier to a namespace, and the second index comprises a user identifier index that relates an event identifier to the user identifier index.

6. The method of claim 5, wherein determining the payload comprises:
   intersecting the search results to remove duplicate event identifiers to yield a list of event identifiers.

7. The method of claim 6, further comprising:
   searching a main index of the first index based on the list of event identifiers to yield the payload.

8. The method of claim 1, wherein determining the index server from the plurality of index servers comprises:
   hashing, by a routing server, a namespace identifier in the query; and
   comparing a result of the hashing of the namespace identifier to a mapping index to identify the index server from the plurality of index servers, wherein the mapping index is cached by the routing server.

9. The method of claim 1, further comprising:
   searching a live cache of events that are not indexed; and
   combining search results identified from searching the live cache with the payload.

10. A system associated with a service, comprising:
    a storage configured to store instructions;
    a routing server configured to:
      receive a query for an event associated with a user account of the service;
      determine an index server from a plurality of index servers that store events associated with the service, wherein the index server comprises a plurality of indexes that index event identifiers based on different properties of an event;
      send an instruction to the index server to search for events based on the query;
      receive a payload from the index server;
      filter the payload based on parameters identified in the query; and
      send the filtered payload to a device associated with the user account, wherein the filtered payload is configured to allow the user account to receive the events that the user account is authorized to access and are identified in the query and wherein the index server is configured to:
        search a first index of the plurality of indexes based on a first property associated with events stored in the index server;
        search a second index of the plurality of indexes based on a second property associated with events stored in the index server; and
        determine the payload based on search results identified from searching the first index and the second index.

11. The system of claim 10, wherein the query identifies at least one namespace accessible by the user account.

12. The system of claim 10, wherein events are stored in the first index and the second index in reverse time order.

13. The system of claim 10, wherein the searching of the first index or the second index is completed based on a timestamp associated with an event.

14. The system of claim 10, wherein the first index comprises a namespace index that relates an event identifier to a namespace, and the second index comprises a user identifier index that relates an event identifier to the user identifier index.

15. The system of claim 14, wherein the index server is configured to:
    intersect the search results to remove duplicate event identifiers to yield a list of event identifiers.

16. The system of claim 15, wherein the index server is configured to:
    search a main index of the first index based on the list of event identifiers to yield the payload.

17. The system of claim 10, wherein the routing server is configured to:
    hash a namespace identifier in the query; and
    compare a result of the hashing of the namespace identifier to a mapping index to identify the index server from the plurality of index servers, wherein the mapping index is cached by the routing server.

18. The system of claim 10, wherein the routing server is further configured to:
    search a live cache of events that are not indexed; and
    combine search results identified from searching the live cache with the payload.

19. A non-transitory computer readable medium comprising instructions, the instructions, when executed by a computing system, cause the computing system to:
    receive a query for an event associated with a user account of a service;
    determine an index server from a plurality of index servers that store events associated with the service, wherein the index server comprises a plurality of indexes that index event identifiers based on different properties of an event;
    send an instruction to the index server to search for events based on the query, wherein the index server is configured to search a first index of the plurality of indexes based on a first property associated with events stored in the index server, search a second index of the plurality of indexes based on a second property associated with events stored in the index server; and determine a payload based on search results identified from searching the first index and the second index;
    receive the payload from the index server;
    filter the payload based on parameters identified in the query; and
    send the filtered payload to a device associated with the user account, wherein the filtered payload is configured to allow the user account to receive the events that the user account is authorized to access and are identified in the query.

20. The non-transitory computer readable medium of claim 19, wherein the query identifies at least one namespace accessible by the user account.

* * * * *